April 3, 1956  F. M. GUY  2,740,673
SHAFT HANGER
Filed April 27, 1953
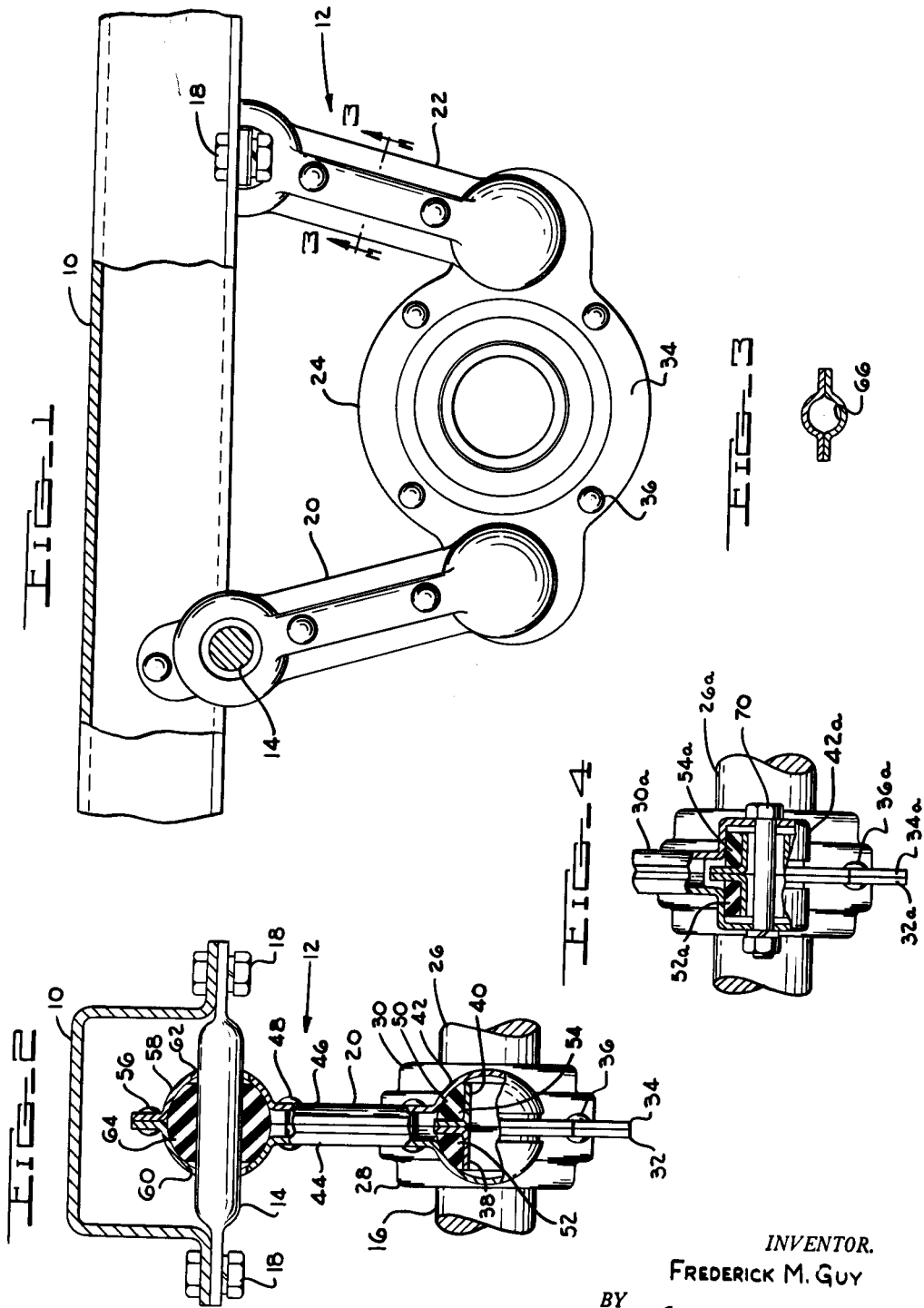
INVENTOR.
FREDERICK M. GUY
BY
Smith and Olsen
ATTORNEYS

United States Patent Office 2,740,673
Patented Apr. 3, 1956

2,740,673
SHAFT HANGER

Frederick M. Guy, Detroit, Mich., assignor to U. S. Universal Joints Company, Detroit, Mich., a corporation of Michigan Application April 27, 1953, Serial No. 351,143

13 Claims. (Cl. 308—28)

The present invention relates to a shaft hanger assembly which is particularly, but not exclusively adapted for use in motor vehicles to provide a resilient support for a driven shaft or the like which may be subject to forces causing its movement in any of a plurality of directions relative to a supporting member.

The present invention is particularly desirable for use in installations where the shaft or supporting member may become misaligned in use, because the hanger is constructed with flexible rubber joints, enabling misalignment of the shaft or supporting member to be accommodated by flexing of the rubber joints. In this manner, the shaft bearing and its grease sealing rings supported by the shaft hanger will always be properly aligned with the shaft, preventing unnecessary wear of either the bearing, its grease sealing rings or the shaft.

However, the invention is also especially suitable whenever it is desired to use a resiliently mounted shaft hanger assembly in which the shaft is to be acoustically insulated from the suspending member to prevent the transmission of noise, vibration, heat or the like from the shaft to the supporting member or vice versa.

It is among the objects of the present invention to provide a shaft hanger assembly having resiliently joints which allow universal movement within predetermined limits of the supported shaft relative to a fixed point of attachment of the hanger assembly to the supporting member, said resilient joints and their associated parts being constructed and arranged to accommodate axial thrusts on the shaft journaling bearing in the most efficient manner so that the bearing, its grease sealing rings and the shaft are protected against unnecessary wear, and so that the maximum life is obtained for these parts as well as for the resilient joints and other parts of the shaft hanger assembly.

It is another object of the present invention to provide a shaft hanger assembly of the foregoing character in which improved resilient bushings are used in the resilient joints so that a more uniform and controlled yield of the shaft hanger is effected when forces are transmitted through the shaft hanger assembly.

It is still another object of the present invention to provide a shaft hanger of the foregoing character which has an improved construction and arrangement of the hanger arms and the manner in which they clamp the resilient bushings in place so that the latter operate most effectively in accommodating relative movements between the shaft and the supporting member for the hanger assembly.

It is still another object of the present invention to provide an improved housing for the shaft hanger which can be constructed to receive the resilient bushings of the foregoing character.

Still another object of the present invention is to provide a shaft hanger assembly which has the housing for the shaft journaling bearing and the shaft hanger arms formed from sheet metal stampings, and which is characterized by the low cost of the component parts and their strength and durability in use.

Other objects of this invention will appear in the following description and appended claims, reference being had to the accompanying drawings forming a part of this specification wherein like reference characters designate corresponding parts in the several views.

In the drawings:

Fig. 1 is a front elevation partly in section showing a shaft hanger assembly embodying the present invention mounted on a portion of a supporting member;

Fig. 2 is a side elevation partly in section of the shaft hanger assembly shown in Fig. 1;

Fig. 3 is a section taken on the line 3—3 of Fig. 1; and

Fig. 4 is a fragmentary side elevation partly in section of a modified form of the embodiment illustrated in Figs. 1 to 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed therein is for the purpose of description and not of limitation.

Referring to the drawing, a support member 10 is shown which may be a part of a motor vehicle (not shown) or of any other device with which the shaft hanger assembly 12 is used. The shaft hanger assembly 12 includes two rods 14, only one of which can be seen on the drawing, said rods 14 being disposed generally parallel to the shaft 16 supported by the shaft hanger assembly 12 and being attached to the support member 10 by a plurality of bolts 18.

Resiliently suspended from the rods 14 are a pair of hanger arms 20 and 22 which are resiliently connected at their lower ends to the housing 24 which carries a shaft journaling bearing (not shown) for the shaft 26.

The housing 24 is formed from two oppositely disposed sheet metal stampings 28 and 30 which are cup-shaped so as to provide a hollow interior in which the shaft journaling bearing (not shown) is housed. Lip portions 32 and 34 extend laterally to form abutting flanges which are held together by a plurality of rivets 36. The lip portions are enlarged on each side of the housing, and contain stub shafts 38 and 40 which were formed therein during the stamping operation. These stub shafts 38 and 40 are adapted to carry the resilient bushings which are used in resiliently joining the hanger arms 20 and 22 to the housing 24.

Referring to Fig. 2 a more detailed description of the lower resilient joint for the arm 20 will be given. It is to be understood that the same type of joint is also used with the arm 22.

The arm 20 has a hollow spherical shaped socket 42 at its lower end which is formed by the two hollow hemispherical shaped portions which comprise the lower ends of the two arm sections 44 and 46. The latter sections are held together by the plurality of rivets 48 to form arm 20.

A spherical shaped resilient bushing 50 formed in two half sections 52 and 54 is seated on the stub shafts 38 and 40 and the inner surface of the spherical socket 42 is clamped in tight engagement with the outer surface of bushing 50 so as to retain said bushing 50 in a pre-loaded condition.

The upper resilient joint for arm 20 is similar to that of the lower resilient joint. The upper ends of arm sections 44 and 46 have hollow hemispherical shaped portions which are fastened together by a plurality of rivets 56 to form the spherical shaped socket 58. The latter has apertures 60 and 62 which are somewhat larger in diameter than the rod 14 so that there is no contact between these parts. Mounted on the rod 14 and held under preloaded conditions by the socket 58 is a spherical shaped resilient bushing 64.

There are several important features of the present invention which include the construction and arrangement of the housing 24 as well as the hanger arms 20 and 22, and also the manner in which the resilient joints are formed between the arms and the housing and between the arms and the supporting member 10.

The housing 24 is formed from sheet metal by a stamping operation so that it will be light in weight and can be manufactured by production methods at a very low cost. The stub shafts 38 and 40 can be formed by the same stamping operation out of the same sheet metal blank as is used for the remainder of the housing, thus requiring no extra material and yet providing a very sturdy construction.

The hanger arms 20 and 22 are also made from sheet metal by a stamping operation so that they likewise can be manufactured by mass production methods at very low cost. These arms are very sturdy, being formed with a hollow center portion as shown at 66 in Fig. 3. This hollow arm structure aids in strengthening the arms while at the same time maintaining their weight at a minimum.

The hollow end portions of the arms and the ball shaped resilient bushings are found to be a very effective construction and arrangement for effecting a more even distribution of applied loads over the entire mass of the bushing whenever the shaft 26 is moved relative to the support member 10. This is particularly true when axial thrusts are applied to the shaft 26. By virtue of the more even distribution of the loading on the bushings, a longer life can be expected from the same and they will be more uniform in their operation of allowing limited relative movements between the shaft 26 and support member 10.

While it is preferred that spherical shaped bushings be used in the present invention, there may be instances where other general shapes may be used for the interior of the sockets on the arms. An example of a cylindrical shaped socket and a cylindrical shaped bushing is shown in Fig. 4 where the reference numbers corresponding to those of the embodiment shown in Figs. 1–3 are used followed by the letter a. In this embodiment a bolt and nut 70 are used to aid in drawing the socket 42a into tight engagement with the cylindrical shaped bushing.

Having thus described my invention, I claim:

1. A shaft hanger assembly comprising a housing adapted to carry a shaft journaling bearing, stub shafts projecting forward and aft from opposite sides of said housing, resilient bushings mounted on said shafts and having generally spherical outer surfaces, hanger arms having hollow spherical lower end portions enclosing said bushings, and support means from which said arms are suspended.

2. A shaft hanger assembly comprising a housing adapted to carry a shaft journaling bearing, stub shafts projecting forward and aft from opposite sides of said housing, supporting pins adapted to be attached to a supporting surface in parallel relation to said stub shafts, spherical shaped resilient bushings mounted on said stub shafts and said supporting pins, and hanger arms extending between the stub shafts and supporting pins and having hollow spherical shaped ends clamped over the resilient bushings so as to maintain the latter in a loaded condition.

3. A shaft hanger assembly comprising a housing adapted to carry a shaft journaling bearing, stub shafts on opposite sides of said housing, supporting pins adapted to be attached to a supporting surface, ball-like resilient bushings mounted on said stub shafts and supporting pins, and hanger arms extending between the stub shafts and supporting pins and having ball socket end portions clamped over the resilient bushings.

4. A shaft hanger assembly comprising a housing adapted to carry a shaft journaling bearing, supporting pins adapted to be attached to a supporting surface, ball-like resilient bushings mounted on said supporting pins, and hanger arms connected at their lower ends to said housing and having ball socket upper end portions clamped over said resilient bushings.

5. A shaft hanger as claimed in claim 4 wherein the hanger arms are connected to said housing by means of ball-like resilient bushings carried by said housing and ball socket end portions on said arms which are clamped over said bushings.

6. A shaft hanger as claimed in claim 4 wherein the hanger arms are connected to said housing by means of cylindrical bushings carried by said housing and socket-like end portions on said arms which are clamped over said bushings.

7. A shaft hanger assembly comprising a housing adapted to carry a shaft journaling bearing, stub shafts on opposite sides of said housing, support pins adapted to be attached to a supporting surface, resilient bushings mounted on said stub shafts and supporting pins, and hanger arms extending between the stub shafts and supporting pins and having socket-like end portions whose interiors are shaped to conform the entire external surface of said resilient bushings, said socket-like end portions being clamped over the resilient bushings to maintain the latter in a loaded condition.

8. In a shaft hanger assembly, a housing adapted to carry a shaft journaling bearing comprising two opposite disposed cup-shaped sheet metal stampings having laterally extending lips adapted to be secured together, each of said lips having stub shafts formed therein so as to extend in fore and aft directions with respect to said housing, and hanger arms resiliently connected to said stub shafts.

9. In a shaft hanger assembly, a housing adapted to carry a shaft journaling bearing, resilient bushings mounted in fore and aft relation on opposite sides of said housing, and hanger arms having hollow end portions which completely cover the fore and aft portions of said bushings and substantially completely enclose such bushings.

10. In a shaft hanger assembly, a housing adapted to carry a shaft journaling bearing comprising two oppositely disposed cup-shaped sheet metal stampings having laterally extending lips adapted to be secured together, each of said lips having stub shafts formed therein so as to extend in fore and aft directions, resilient ball-shaped bushings mounted on said stub shafts, and hanger arms having hollow sockets at their lower ends clamped over said ball-shaped bushings.

11. In a shaft hanger assembly including a housing adapted to carry a shaft journaling bearing and having fore and aft stub shafts on its opposite sides, hanger arms formed from sheet metal and having fore and aft sections secured together, said sections having oppositely disposed concave end portions fitted over the ends of said stub shafts, and resilient bushings mounted on said stub shafts and held in compression by the end portion of said arms.

12. In a shaft hanger assembly including a housing adapted to carry a shaft journaling bearing and supporting rods extending fore and aft and adapted to be secured to a supporting surface, hanger arms formed from sheet metal and having fore and aft sections secured together, said sections having oppositely disposed concave symmetrical end portions disposed on said rods, and resilient bushings carried on said rods within said concave end portions so as to prevent metal to metal contact between the rods and the end portions.

13. In a shaft hanger assembly including a housing adapted to carry a shaft journaling bearing, hanger arms for carrying the housing having hollow spherical-shaped end portions, and spherical-shaped resilient bushings held within said end portions and adapted to be mounted on associated shafts hanger parts.

References Cited in the file of this patent

UNITED STATES PATENTS

| | | |
|---|---|---|
| 1,305,815 | Liebowitz | June 3, 1919 |
| 1,909,100 | Geyer | May 16, 1933 |
| 2,560,759 | Evernden et al. | July 17, 1951 |
| 2,580,119 | Meyers | Dec. 25, 1951 |
| 2,661,985 | Guy et al. | Dec. 8, 1953 |
| 2,674,330 | Feil | Apr. 6, 1954 |

FOREIGN PATENTS

| | | |
|---|---|---|
| 968,283 | France | Nov. 23, 1950 |